United States Patent
Klemenz

(10) Patent No.: US 10,528,406 B2
(45) Date of Patent: Jan. 7, 2020

(54) PROTOCOL EXTENSIBILITY FOR AN APPLICATION OBJECT FRAMEWORK

(71) Applicant: SAP SE, Walldorf (DE)

(72) Inventor: Oliver Klemenz, Sinsheim (DE)

(73) Assignee: SAP SE, Walldorf (DE)

( * ) Notice: Subject to any disclaimer, the term of this patent is extended or adjusted under 35 U.S.C. 154(b) by 247 days.

(21) Appl. No.: 15/376,343

(22) Filed: Dec. 12, 2016

(65) Prior Publication Data

US 2018/0165140 A1    Jun. 14, 2018

(51) Int. Cl.
*G06F 3/00* (2006.01)
*G06F 9/54* (2006.01)
*H04L 29/08* (2006.01)

(52) U.S. Cl.
CPC ............ *G06F 9/548* (2013.01); *H04L 67/146* (2013.01)

(58) Field of Classification Search
CPC ...................................................... G06F 9/548
USPC ........................................................ 719/310
See application file for complete search history.

(56) References Cited

U.S. PATENT DOCUMENTS

| 9,037,735 B1* | 5/2015 | Fallows | H04L 67/42 709/228 |
| 2004/0003089 A1* | 1/2004 | Chiu | H04L 29/06027 709/227 |
| 2004/0034860 A1* | 2/2004 | Fernando | G06F 9/46 719/315 |
| 2007/0256055 A1* | 11/2007 | Herscu | G06F 8/51 717/115 |

OTHER PUBLICATIONS

Qigang Liu, Research of Web Real-Time Communication Based on Web Socket . (Year: 2012).*

* cited by examiner

*Primary Examiner* — Lechi Truong
(74) *Attorney, Agent, or Firm* — Mintz Levin Cohn Ferris Glovsky and Popeo, P.C.

(57) ABSTRACT

An application object framework provides a software developer with an ability to configure protocol extensions to the application object framework. The software developer may be enabled to configure protocol extensions to the application object framework that enable network communications using protocols that were not originally designed for use by the application object framework, or that did not exist at a time of creation or purchase of the application object framework.

20 Claims, 9 Drawing Sheets

200

Receive, at a protocol extension framework of an application object framework, a registration request to register a protocol extension and associated protocol extension configuration file
202

Receive, from a client application, a request constructed using a protocol of the client application, the request identifying an application object and specifying a database action for accessing application object data of the application object from within a database associated with the application object framework
204

Select the protocol extension from among at least two available protocols for routing of the request thereto, based on the request
206

Map, at the protocol extension and based on the protocol extension configuration file, the database action specified using the client application protocol to a corresponding database action specified using the selected protocol extension
208

Execute the database action with respect to the application object data, based on the corresponding database action specified using the selected protocol extension
210

FIG. 2

PROTOCOL EXTENSIBILITY FOR AN APPLICATION OBJECT FRAMEWORK

TECHNICAL FIELD

This description relates to techniques for executing network communications.

BACKGROUND

There are many different approaches for providing software applications and/or related functionalities. For example, in some paradigms, a client interfaces with an application server executing application code, and the application server interfaces with a database to store, access, or manipulate application data.

Although useful in many contexts, such paradigms may suffer at points of interface between components, such as between the client and the application server, or between the application server and the database. For example, communications between the client and application server may be inefficient, such as when the application server updates and there is a delay, or a requirement for action, on the part of the client/user, before the updates are communicated to the client. In other examples, software applications may require movement of data between the application server and the database for processing and storage of the data, which may be inefficient and time-consuming.

Some applications are written and constructed using application objects. Such application objects may contain relevant data, as well as logic and rules for processing data, or for interfacing with other application objects, or otherwise providing desired software functionality. Such application objects provide a number of known conveniences and advantages with respect to the development and execution of software applications.

However, as the application objects are generally discrete and potentially specific to associated contexts, there may be inefficiencies related to using such application objects. For example, it may be undesirably necessary to repeat a single function or aspect across each of a plurality of application objects, which may lead to redundant and inefficient development efforts on the part of application object developers.

Moreover, individual application objects may not interface with each other, or with other local or remote software, in a sufficiently flexible and complete manner. Such interface difficulties may particularly occur in scenarios in which new communications protocols are provided after a time that the application object(s) are created, and/or when existing communications protocols do not fully meet the particular needs and abilities of the application object(s) being developed.

SUMMARY

Techniques are provided for enabling an application object framework that is flexible, efficient, and easy to use, with respect to both developing and implementing software applications. The application object framework can be implemented directly in the context of a database system, such as an in-memory database system, so as to enable direct access to needed data. The application object framework enables both core and custom actions associated with a potentially large number of application objects, so that software developers do not have to implement such actions individually and repetitively for newly-developed or modified application objects.

In some implementations, the application object framework provides a software developer with an ability to configure protocol extensions to the application object framework. For example, the software developer may be enabled to configure protocol extensions to the application object framework that enable network communications using protocols that were not originally designed for use by the application object framework, or that did not exist at a time of creation or purchase of the application object framework.

In additional or alternative implementations, the application object framework enables simultaneous, bi-directional communications between one or more application objects and a client(s) providing a user interface, which may be executing an instance of one or more of the application objects. For example, the application object framework enables an efficient and customized use of existing or newly-created network communications protocols, such as the web socket protocol, to provide simultaneous, bi-directional communications that are easily customized to the semantics, actions, and other aspects of individual application objects, or application object types.

The details of one or more implementations are set forth in the accompanying drawings and the description below. Other features will be apparent from the description and drawings, and from the claims.

BRIEF DESCRIPTION OF THE DRAWINGS

FIG. 2 is a flowchart illustrating example operations of the system of FIG. 1.

DETAILED DESCRIPTION

Figure 1:
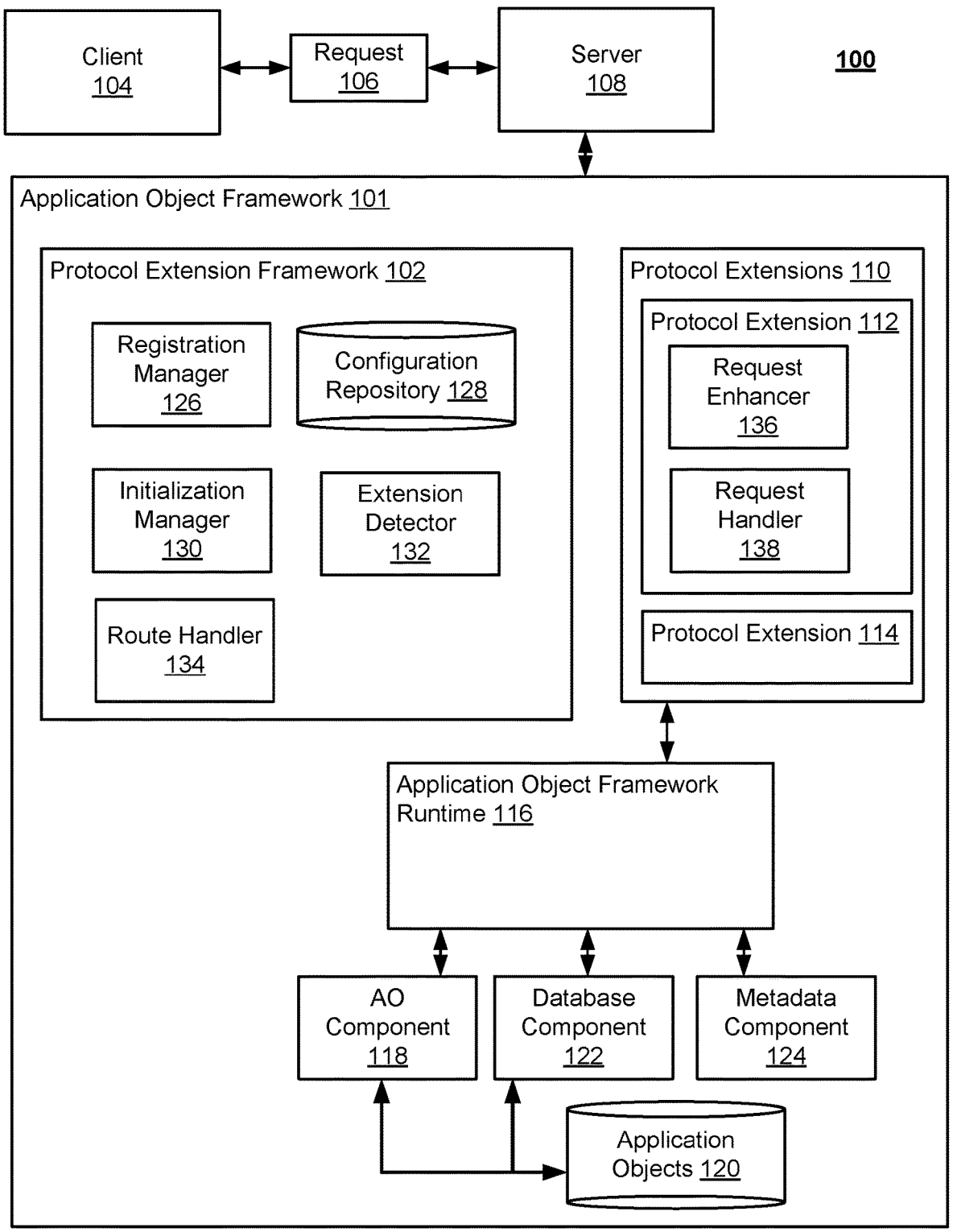
FIG. 1 is a block diagram of a system implementing a protocol extension framework.

FIG. 1 is a block diagram of a system 100 that includes an application object framework 101 utilizing a protocol extension framework 102. More particularly, the protocol extension framework 102 is configured to operate an environment in which a client 104 sends a request 106 to (and has other interactions with) a server 108, and utilizes a plurality of configurable extensions 110 (represented in FIG. 1 by example protocol extensions 112, 114, which also may be referred to as extensions), to thereby facilitate interactions with an application object framework runtime 116.

The protocol extension framework 102 thus provides a number of features and advantages to a user of the application object framework runtime 116, e.g., with respect to designing and executing applications for use at the client 104. For example, a user of the application object framework runtime 116 may be enabled to design and implement software applications for use by the client 104 in a manner that utilizes one or more network/communications protocols that were not originally provided or available at a time of purchase, creation, delivery, or original access to the application object framework runtime 116, as described in more detail below. Accordingly, a developer or other user of the application object framework runtime 116 may obtain the benefits provided by the extensions 110, including, e.g., enhanced efficiencies in the development and/or implementation of a new or existing application, including an ability to provide new or additional features for the use and enjoyment of a user of the client 104.

In the present description, network and/or communications protocols should generally be understood to represent and include standardized rules, procedures, and/or formats that govern network communications between two or more network devices. Generally speaking, different types of such protocols will have differing levels or layers of applicability in the context of network communications, and may provide different features and advantages, while also being associated with various potential drawbacks and challenges.

For example, some such protocols may be applicable at a relatively low level or layer of network communications, and may thus be generic or applicable to a large number of software applications and associated execution context. On the other hand, other types of protocols may be more specific or customized for particular applications or application types, and, (only) within these specialized contexts, may be able to provide more customized features. Moreover, it may be necessary or helpful for a developer or other user of the application object framework runtime 116 to be able to interact with legacy protocols that may still be in use at a time of development of a new application, even when new or updated protocols exist.

In general, and as referenced above, a software application developer in the context of the system 100 may wish to develop or update a software application with a focus on new software features to be provided to the user of the client 104. It would be inefficient or infeasible for such a developer to develop software in a manner that requires the developer to create and/or configure basic application and/or network-related functionalities. Accordingly, the system 100 may be implemented in the context of an application object framework 101 that is designed to provide a software developer with many such basic functions/features, so that the software developer may focus on providing new, specialized features that are specific to the application being developed.

Such an application object framework 101, or any other application framework, may be implemented using a variety of techniques and configurations. For example, although illustrated as a separate, individual component, it will be appreciated that the server 108 may be implemented using one or more servers, which may individually or collectively be utilized to implement the application object framework 101, including, e.g., some or all of the protocol extension framework 102, the extensions 110, the application object framework runtime 116, and/or various other components, as described in detail by way of various non-limiting examples in the following description.

In the non-limiting example of FIG. 1, the application object framework 101 includes an application object component 118 that interacts with stored application objects 120, e.g., in conjunction with a database component 122. The database component 122 may be used to provide database management and access features with respect to the application objects 120. Further, a metadata component 124 may be utilized to provide metadata and associated schemas designed to govern runtime operations of corresponding application objects (e.g., or types or instances thereof) in the context of the application object framework runtime 116.

In some implementations, the application objects 120 may be stored in appropriate database tables of a database system, so that the application object data should be accessed in a manner that is appropriate for the database system being used. For example, in some implementations, such as the example of FIG. 3, below, such a database system may include the high performance analytic appliance ("HANA") system as developed by SAP SE of Waldorf, Germany. As described in detail below, such database access techniques may not typically correspond directly with, or be enabled for use by, one or more of the various types of protocols that a software developer may wish to utilize when accessing the data of the application objects 120 in the context of a specific application/application object. Consequently, as referenced above and described in detail below, the protocol extension framework 102 may be configured to provide and implement the various extensions 110 in a manner that enables desired types of end-to-end communications between the client 104 and the application objects 120.

For example, some types of database access may be widely applicable and substantially generic to many or all applications developed in the context of the application object framework 101. For example, such database access techniques may include create, read, update, and delete ("CRUD") operations. Additionally, individual application objects or types of application objects may be associated with more detailed or customized database access techniques, such as when a particular application is associated with semantics or syntax that are designed for use by a specific application object. In any or all such database access techniques, the protocol extension framework 102 provides a software developer with easy access to required application data, along with an ability to utilize any desired protocol that may be necessary or helpful in enabling desired features and functions of the software application being developed.

Thus, the application object framework 101, including the protocol extension framework 102, provides the ability to maintain, store, and access various types of data, and to thereby provide transactional software applications, and other types of software applications, in an efficient and highly customizable manner. In particular, the application object framework 101 provides for enhanced development efficiency, in that a simple application object including basic CRUD functionality may be quickly enabled, while also providing for enhanced supportability, testability, and extensibility in developing and implementing desired software applications.

In the specific, non-limiting example of FIG. 1, the application object component 118 may be configured, perhaps in conjunction with the database component 122, to load a specific application object from the application objects 120. The loaded application object may thus be enabled for execution by way of a runtime interface that is provided by the application object framework runtime 116, in conjunction with corresponding metadata obtained from the metadata component 124. More particularly, for example, the application object component 118 may load a library corresponding to a requested application object, including its definition, structure, attribute, action, checks, or determinations.

Metadata obtained from the metadata component 124 may include a corresponding metadata schema that provides information regarding metadata definitions associated with the requested application object. In this way, for example, metadata that may be common to a structure, configuration, or operation of a plurality of application objects may be repeatedly utilized in conjunction with each of a plurality of corresponding application objects when generating a runtime interface in the context of the application object framework runtime 116.

In this way, the application object framework runtime 116 may be configured to execute various application object operations including basic CRUD operations, as well as any other methods and/or custom actions. During the creation of the runtime interface, an application object name of a specific application object may be utilized to load specific application object definitions from a library file of the application objects 120. As referenced above, the various operations just referenced may be associated with a number of other, related and appropriate actions associated with providing access to the application objects 120, such as, for example, any necessary checks, authorizations, or buffering operations.

Thus, the above-described aspects of the application object framework 101 provide example implementation contexts for the protocol extension framework 102, and associated extensions 110. Also by way of example on the client side of the system 100, it may occur that the request 106 is received from the client 104 in a format that is compatible with the client 104. For example, the request 106 may be formulated using the hypertext transfer protocol (HTTP). The request may include an identification of a desired application object using a corresponding, appropriate uniform resource locator (URL) associated with the desired application object of the application objects 120. Further, the request 106 may include a request body that specifies, for example, an action to be performed with respect to data of the application object of the application objects 120. As already described above, such a requested action may include, for example, a basic CRUD operation, or a more specialized, customized database interaction that is associated with the requested application object or type of application object.

As also referenced above, the protocol extension framework 102 is configured to provide necessary intermediate operations (e.g., middleware, routing, translation, and/or mapping) required to enable end-to-end communications between the HTTP-based request 106 and desired, relational database access required by the application objects 120, utilizing a selected protocol extension 112, 114 from among the protocol extensions 110.

Accordingly, and as shown in the simplified example of FIG. 1, the protocol extension framework 102 may include a registration manager 126 that is accessible by a user of the protocol extension framework 102, and that enables definition and storage of a desired protocol extension configuration within a configuration repository 128. For example, such a user may wish to register the example protocol extensions 112, 114, and may thus interact with the registration manager 126 to register corresponding configuration files for storage within the configuration repository 128. Specific examples of the protocol extensions 112, 114, and the corresponding configuration files stored within the configuration repository 128, are provided in detail below. For purposes of the simplified example of FIG. 1, it will be appreciated that the user of the protocol extension framework 102 may be enabled to register any desired plurality of protocol extensions within the configuration repository 128, either within a single registration process, or by adding individual protocol extension configurations over time, e.g., as new protocols become available or desired.

In practice, it may not be necessary or desirable to utilize all such registered protocol extensions in the context of any particular execution instance of the application object framework 101 and/or associated application or application objects to be executed. In other words, for example, during startup operations of the server 108, it may occur that the one or more applications and associated application objects to be executed may only require the protocol extension 112, while not requiring the protocol extension 114. Consequently, during startup operations of the server 108, an initialization manager 130 may be configured to initialize only those protocol extensions that would be required during following operations of the application object framework 101. Examples of these and other initialization operations of the initialization manager 130 are provided in further detail below, e.g., with respect to the example of FIG. 3.

Once startup of the server 108 has occurred, and the appropriate protocol extensions 110 have been initialized by the initialization manager 130, the protocol extension framework 102 may be utilized in the context of the application object framework 101 to provide runtime access by the client 104 to the application object framework runtime 116. Specifically, upon receipt of the example request 106, an extension detector 132 of the protocol extension framework 102 may examine the request 106 to determine an appropriate protocol extension of the protocol extensions 110 to be used.

For example, it may occur that the request 106 is associated with, or includes, a file having a file extension that corresponds to a particular protocol extension of the protocol extensions 110. Specific examples of file extensions corresponding to specific protocol extensions are provided below, e.g., with respect to FIG. 3. Other examples of operation of the extension detector 132, such as when no particular or distinctive file extension is utilized in the request 106, and/or when a default file extension is utilized, are also described below with respect to FIG. 3, or would be apparent to one of skill in the art.

Once the protocol extension has been identified by the extension detector 132, a route handler 134 may be configured to route the request 106 to the appropriate, corresponding protocol extension of the protocol extensions 110. For example, the route handler 134 may route the request 106 to the protocol extension 112. As shown, the protocol extension 112 may include a request enhancer 136 that is configured to enhance the request with additional features or functions. For example, such enhancements may include security features, such as authorization requirements, examples of which are provided below. In other examples, enhancements may be related to providing web socket related interfaces or other web socket functionalities.

As also illustrated, the protocol extension 112 may include a request handler 138. The request handler 138 may be configured, for example, to provide a mapping of terms and other aspects of the request 106 to one or more corresponding application objects. For example, the request 106 may include a URL identifying a specific application object and a corresponding action (specified, e.g., using an HTTP command) to be executed in conjunction with specified data of the application object. The request handler 138 may be configured to identify the application object and map the specified action to corresponding terminology associated with the protocol extension 112. In this way, the desired data access and/or manipulation may be obtained. Specific examples of operations of the request handler 138 are provided below, e.g., with respect to FIG. 3, or would be apparent to one of skill in the art.

The various components of the system 100 of FIG. 1 are illustrated as separate, individual, discrete components, sometimes illustrated as being organized as sub-components of a larger component. However, as referenced above, it will be appreciated that any such individual component may represent two or more instances of the same component, and/or may be implemented as two or more sub-components of the illustrated component. Similarly, but conversely, it will be appreciated that two or more sub-components may be combined for implementation as a single component.

Moreover, where two or more instances of a single component may be implemented, it will be appreciated that two or more of the various illustrated components may be implemented in different ones of the multiple instances, and that operations of a single component may be modified or enhanced to reflect interactions with the plurality of instances of each such component. For example, where a plurality of instances of (perhaps different types of) the server 108 are utilized, two or more elements of the protocol extension framework 102 may be implemented in two or more instances of the different servers. Similarly, where two or more clients interact with the application object framework 101, the route handler 134 may be configured to perform client-specific routing of requests received from various clients.

Finally with respect to the simplified example of FIG. 1, the request 106 is illustrated and described as being received from the client 104. Of course, information and data may also be sent from the server 108 to the client 104, including a response to the request 106. For example, requested data may be sent, or a confirmation of completion of a requested database action may be sent. Such a response may be sent in accordance with, and utilizing, the protocol extension framework 102, as described in various examples, below. For example, it may be necessary to select a correct protocol extension of the protocol extensions 110 to send a particular response.

FIG. 2 is a flowchart 200 illustrating example operations of the system 100 of FIG. 1. In the example of FIG. 2 (and similarly in other flowcharts illustrated and described herein) operations 202-210 are illustrated as separate, sequential operations. In various additional or alternative implementations, one or more of the operations 202-210, or sub-operations thereof, may be performed in a different order than that illustrated, and/or one or more of the operations or sub-operations may be omitted. Further, any two or more of the various operations or sub-operations may be performed in a partially or completely overlapping or parallel manner, or in a nested, iterative, looped, or branched fashion.

In the example of FIG. 2, at a protocol extension framework of an application object framework, a registration request to register a protocol extension and associated protocol extension configuration file may be received (202). For example, as described and illustrated above with respect to FIG. 1, the registration manager 126 may receive a request to register the protocol extension 112 with the protocol extension framework 102, and an associated protocol extension configuration file may be stored within a configuration repository 128.

From a client application, a request constructed using a protocol of the client application may be received, where the request identifies an application object and specifies a database action for accessing application object data of the application object from within a database associated with the application object framework (204). For example, the extension detector 132 may receive the request 106 from the client 104. As referenced above and described in more detail below with respect to FIG. 3, the request 106 may include a URL identifying an application object of the application objects 120, as well as a specified, parameterized database action being requested with respect to application object data of the identified application object.

The protocol extension may be selected from among at least two available protocols for routing of the request thereto, based on the request (206). For example, the extension detector 132 may analyze the client request in terms of characteristics thereof that have been preconfigured, using the configuration file(s) of the configuration repository 128, to enable identification of an appropriate, corresponding protocol extension. For example, it may occur that one or more file extensions used in creating some or all of the client request, and thereby characterizing a content thereof, may be detected by the extension detector 132 and utilized to determine the appropriate protocol extension. The route handler 134 may thus proceed to route the client request, e.g., the request 106, to the appropriate protocol extension, such as the protocol extension 112.

At the protocol extension and based on the protocol extension configuration file, the database action specified using the client application protocol may be mapped to a corresponding database action specified using the selected protocol extension (208). For example, the request handler 138 of the protocol extension 112 may be configured to map a database action specified using the HTTP protocol of the request 106, such as a GET command, to a corresponding command of the protocol extension 112, such as a READ command or other corresponding, appropriate terminology of the protocol extension being used.

The database action may then be executed with respect to the application object data, based on the corresponding database action specified using the selected protocol extension (210). For example, the request handler 138 may execute the specified database action in the context of the application object framework runtime 116 and with respect to the identified application object of the application objects 120, including creating, reading, updating, or deleting application object data, and/or executing any customized application object logic that may be specified by the application object and/or corresponding metadata associated with the metadata component 124.

Figure 3:
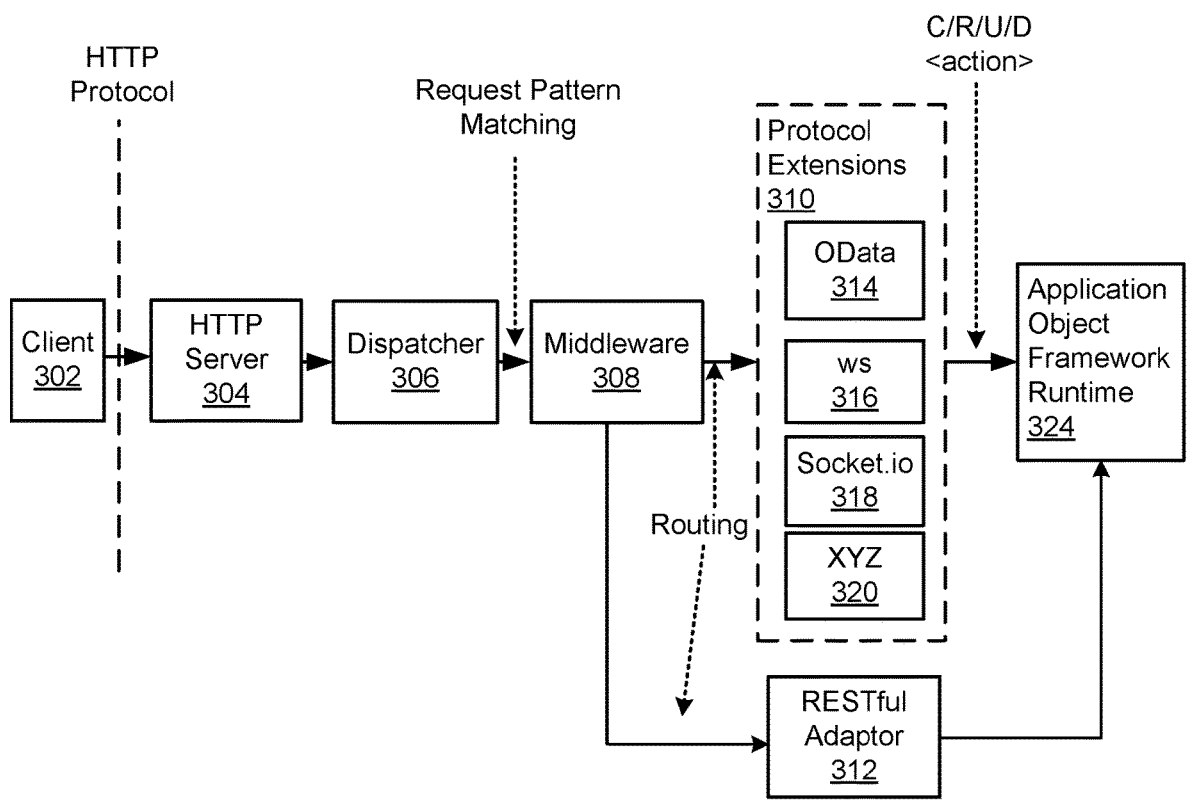
FIG. 3 is a block diagram of a system illustrating more detailed example implementations of the system 100 of FIG. 1.

FIG. 3 is a block diagram of a system 300 illustrating more detailed example implementations of the system 100 of FIG. 1. In the example of FIG. 3, as referenced above, the application object framework 101 is implemented using the HANA system as developed by SAP SE of Waldorf, Germany, or similar or related in-memory or main memory database system. For example, the application object framework 101 may be implemented using the HANA platform and associated extended services ("XS") engine.

In some implementations, the application object framework may be implemented and coded using a server-side language, for example, JavaScript. In related, specific example implementations, the application object framework thus provides a persistency framework for JavaScript/JSON (JavaScript Object Notation) objects, e.g., implemented in a runtime environment such as node.js. In such examples, the application object framework thus provides the runtime for an object declaration file to model application objects, e.g., as aggregations of hierarchical nodes mapped to corresponding entities within database tables of the larger database system. Accordingly, application logic of application objects may be described using determinations, checks, and actions to express relevant semantics, while associated metadata/properties may be used to describe corresponding structural representations.

Thus, in the example of FIG. 3, a client 302 is connected by way of the HTTP protocol, as shown to an HTTP server 304. The application object framework runtime 324 of FIG. 3 is connected by way of a dispatcher 306 to a corresponding HTTP routing mechanism of a middleware 308. For example, such functionality may be provided using the "express" module of node.js.

In more detail, the client 302 connects to the HTTP server 304 using a URL that addresses a resource on the server's application framework, e.g., a corresponding application object. The HTTP request is processed by the server's dispatcher middlewares, so that, in the example of FIG. 3, dispatching is performed by the dispatcher 306. In the example, dispatching may be based on a file extension of the included URL, as well as on a protocol type (e.g., here, HTTP) to thereby determine a correct protocol extension to be called. As already described above with respect to FIGS. 1 and 2, these actions of the dispatcher 306 may be conducted based on a configuration file previously stored within the configuration repository 128, in conjunction with a registration of one or more corresponding protocol extensions using the registration manager 126.

For example, pseudocode 1 provides a simplified example of such a configuration file:

PSEUDOCODE 1

```
var ExtensionType = {
    default: [„js"],
    odata: ["odata", "xsodata"],
    websocket: [ ]
};
```

As shown in pseudocode 1, the variable "extension type" specifies a set of protocol extensions, which may be potentially addressed within an HTTP URL using one or more corresponding file extensions. In the simplified example of pseudocode 1, a protocol extension using ODATA (the open data protocol) is specified using a file extension "ODATA" or "XS ODATA." As a result, an ODATA call may be requested using an example URL ". . . /applicationobject.odata," and by "url . . . /applicationobject.xsodata."

As also illustrated in the example of pseudocode 1, it may occur that a protocol extension does not map to a specific file extension, such as when a protocol extension implements its own HTTP protocol, thereby handling the necessary implementation mapping. In the example of pseudocode 1, an example web socket protocol extension is illustrated as an example of a protocol extension that does not require a separate file extension. The example of a web socket based protocol extension, and related examples, are provided in detail below, with respect to FIGS. 6-10. Accordingly, the middleware 308 may proceed to route the client request to at least one of the protocol extensions 310.

In the example implementation of FIG. 3, a default REST adaptor 312 is provided, which may also be used by the middleware 308 to route the request to the application object framework runtime 324. In other words, in the example, the application object framework of the system 300 may be provided in an initial or "out-of-the-box" state as including at least the RESTful adaptor 312 providing at least a REST-based protocol extension for receiving the HTTP request from the client 302.

Of course, as should be understood from the above description, it is anticipated that such a default adaptor will not typically be sufficient to provide all necessary interactions with the client 302, and/or will not be able to provide necessary interactions in a manner that is sufficiently flexible, efficient, or customizable, so that it is desirable to add additional protocol extensions 310. Nonetheless, the RESTful adaptor 312 provides a default protocol that may be useful in many implementations of the application object framework. Consequently, and as referenced within 1 above, a default extension "js" may be recognized as requiring routing by the middleware 308 to the REST full adaptor 312. Similarly, in scenarios in which no file extension is provided, or is provided but is not recognized by the middleware 308, default routing may proceed to the RESTful adaptor 312.

In more detail, the RESTful adaptor 312 may perform a default mapping in which an HTTP "POST" operation is mapped to "CREATE," a PUT or PATCH operation is mapped to "UPDATE," a "GET" operation is mapped to "READ," and a "DELETE" operation is mapped to "DELETE."

In the example of FIG. 3, as referenced above with respect to pseudocode 1, an example of protocol extensions 310 includes the odata protocol 314, as well as web socket-based protocols, such as the "ws" protocol 316, and the socket.io protocol 318. Additionally, as described in more detail below with respect to FIGS. 4 and 5, an entirely new protocol extension "xyz" 320 may also be added to the protocol extension 310.

Thus, for example, with respect to the odata protocol extension 314, an appropriate configuration file for the odata protocol extension 314 may specify an appropriate protocol mapping. For example, a received "GET" request/method may be mapped to, and trigger, a respective "SELECT" action, so that the protocol extension 314 passes the relevant URL plus the select-based action to the application object framework runtime 324, and ultimately returns the result of the requested action back to the middleware 308 for return to the client 302. As also referenced, operations of the example protocol extensions based on the web socket protocol (316, 318) are described in more detail below, with respect to FIGS. 6-10.

When adding a new protocol extension, represented generically by the xyz protocol 320 in the simplified example of FIG. 3, it may be necessary or desirable to include various aspects of one or more protocol extension interfaces, e.g., in order to provide desired functionalities during executions of client requests. In the example of FIG. 3 in which a JavaScript-based engine is used, it is possible to define a new JavaScript file that can be registered, e.g., using the registration techniques described above in the context of a node.js server. Then, every time a client request is detected having a corresponding file extension for the added protocol extension xyz 320, the added JavaScript files will be called, and the appropriate interface may be executed.

For example, such a protocol extension interface may include an initialization function, including an index function to initialize the protocol extension when the server starts. For example, the function init may be added as "function init(oApp, oOptions, vStoreInfo) { }". As just referenced, such an init function may be called during server start operations, when the respective protocol extension has been configured in corresponding middleware settings, the init function may thus enable the added protocol extension (e.g., the xyz protocol extension 320) to define matching routes for which the protocol extension will be called. An application router argument "oApp" may be passed as a first argument, and configured according to a corresponding router's registration principles. A second argument "oOptions" may be configured to hold server configuration settings for the application object framework, e.g., an application object name and URL path mapping. Finally in the example, the third argument "vStoreInfo" may be used to provide details regarding particular storage implementations as specified in relevant server configuration settings for the application object framework.

A second function, represented by the request enhancer 136 in FIG. 1, may be implemented as "function enhanceRequest(sObjectName, oRequest, oResponse, oOptions) { }". The enhance request function may be called for each request, although it may not be processed by the specific protocol extension implementation. Rather, the enhance request function enables enhancement of the requested object with properties that are specific to the protocol extension, and that may be helpful or necessary for further processing of the request in the context of a specific application object implementation (e.g., security-related features). In other words, for example, the request enhancement of a particular protocol extension, such as the web socket-based socket.io extension 318, may be used to enhance a request of a different protocol, such as a rest or odata call. In this way, during later implementation of the application object in question, the application object will be enabled to utilize the provided enhancement. For example, in the example just provided, the socket.io extension 318 may provide access to a particular name space so that a specified application object may utilize the name space provided.

By way of further example with respect to web socket-related scenarios, a normal REST request may be enhanced with web socket functionality, whereupon all or many implementations of the called application object will have access to this web socket interface, e.g., to emit specific events or messages. In other words, even when a standard RESTful request is received, web socket events may be triggered, if the relevant protocol extension establishes the web socket context and enhances the request with the interface of the web socket. In such cases, the application object can then accept the web socket interface and call respective messages and events.

As shown, the enhance request function may include appropriate arguments. For example, the enhance request function may include the argument "sObjectName," referring to the application object related to the request enhancement. The enhance request function may also include arguments "oRequest" and "oResponse," as well as an argument "oOptions." As may be appreciated, these arguments allow the enhance request function to pass a request associated with the enhancement being requested to the application object in question, or a delegated object, provide response options, and ultimately receive a response to the request.

Similarly, a third function of the protocol extension interface is the request handler function, corresponding generally to the request handler 138 of FIG. 1. For example, the function "handlerequest" may be implemented as: "function handleRequest(sObjectName, oRequest, oResponse, oOptions) { }", in which the same types of arguments just described with respect to the enhance request function are included. The "handlerequest" function will thus be called for each request that is to be processed by the specific protocol extension implementation receiving the request.

The function "handlerequest" enables interpretation of the incoming request, as well as execution of the derived core application object action on the application object framework runtime 324. In other words, the function "handlerequest" should be understood to leverage the application object framework runtime 324 to process the request, such as by obtaining the relevant instance and calling every database action on the application object instance necessary to implement the request being processed. Further, the function "handlerequest" may be utilized to fill, transmit, or otherwise process a response returned to the client 302 associated with satisfaction of the received request, e.g., mapping the results of the requested database action to an HTTP response provided to the client 302. The function "handlerequest" may also be used to delegate the received request to another module, which may then process the parameters "oRequest," and "oResponse."

With respect to the dispatcher 306 and the middleware 308, and as referenced above with respect to the initialization manager 130 and the function "init," it may be necessary during server start operations to evaluate the server configuration to decide which configured protocol extension should be instantiated and configured within route matching paths. For example, a simplified example of a server configuration for the application object framework 101 of FIG. 1 might be provided as shown in pseudocode 2:

PSEUDOCODE 2

```
var xsodata = require("sap-xsodata");
var socketio = require("socket.io");
var http = require("http");
var aof = require("sap-aof");
var app = express( );
var server = http.Server(app);
var io = socketio(server);
    aof.middleware(app, {
applicationObjects: {
    "<applicationObjectName>": "<applicationObjectPath>"
},
extensions: {
    odata: {
        name: "sap-xsodata",
        lib: xsodata
    },
    websocket: {
        name: "socket.io",
        lib: io
        }
    }
});
```

As may be observed from pseudocode 2, the server middleware of the application object framework is configured in the example with two protocol extensions "odata" and "websocket." Each protocol extension implementation is named, i.e., odata is implemented as "SAP-xsodata," while "websocket" is implemented as "socket.io." The protocol extension name may be used in this manner to look up a corresponding protocol extension implementation for the configured protocol extension. That is, for example, a protocol extension implementation name may be used to look up an implementation file (e.g., a JavaScript file) within the application object framework. If the name is a file path, then the application object framework may look up the protocol extension implementation using the file path location.

Additional parameters may be specified next to the "name," e.g., to define additional protocol extension options. For example, if the protocol extension implementation requires an additional module, this requirement may be specified in order to provide a specific desired function for the client application 104, and may be passed as parameter "lib." Arbitrary properties may additionally be defined in the options argument described above.

Thus, the middleware configuration may be provided as options for the various protocol extension implementation functions using appropriate parameters, to thereby derive, for example, necessary route matching on the defined application object name/paths. When the relevant protocol extension implementation is loaded from the name/file path and initialized during server start operations for all protocol extensions configured in the middleware options, as described herein, the system 300 will be prepared to accept incoming client requests from the client 302.

For each request that is appropriately identified, request processing may be delegated to the middleware's extension dispatching which calls the function "handlerequest" of the relevant protocol extension. Accordingly, the protocol extension is enabled to handle the request, i.e., call the respective application object action, and ultimately fill the corresponding result to the client, based on the action result. As also described, the function "enhancerequest" may be called for each request on each active protocol extension, in order to allow the addition of properties to the requested object that may be necessary for further processing in the application object implementation.

Figure 4:
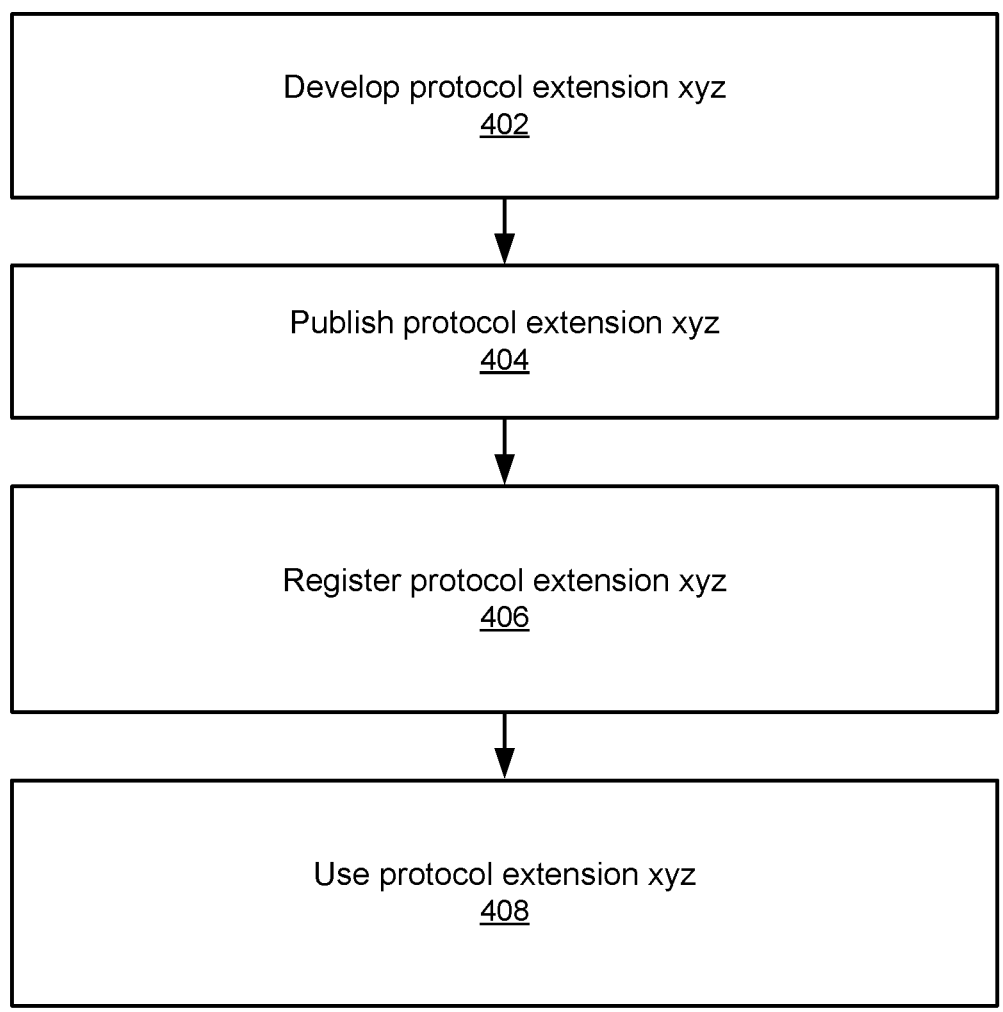
FIG. 4 is a flowchart illustrating example design-related operations associated with a protocol extension of FIG. 3.

FIG. 4 is a flowchart 400 illustrating example design-related operations associated with the protocol extension xyz 320 of FIG. 3. In the example of FIG. 4, the protocol extension xyz is developed (402). For example, the protocol extension framework 102, e.g., the registration manager 126, may provide an appropriate interface to an application developer or other user of the application object framework 101, with which the user may provide an appropriate configuration file for storage within the configuration repository 128. For example, the UI may enable the user to define mappings between known actions, operations, or parameters of expected client requests and corresponding, available database actions, including database actions in compliance with application logic of one or more application objects 120.

Accordingly, the protocol extension xyz may be published (404), and registered by way of the registration manager 126 for inclusion within the protocol extensions 110/310 (406). The protocol extension xyz may then be used within the context of the protocol extensions 110/310, in accordance with its registration with the dispatcher 306/middleware 308, and in accordance with specific, corresponding client requests received from the client 302.

Figure 5:
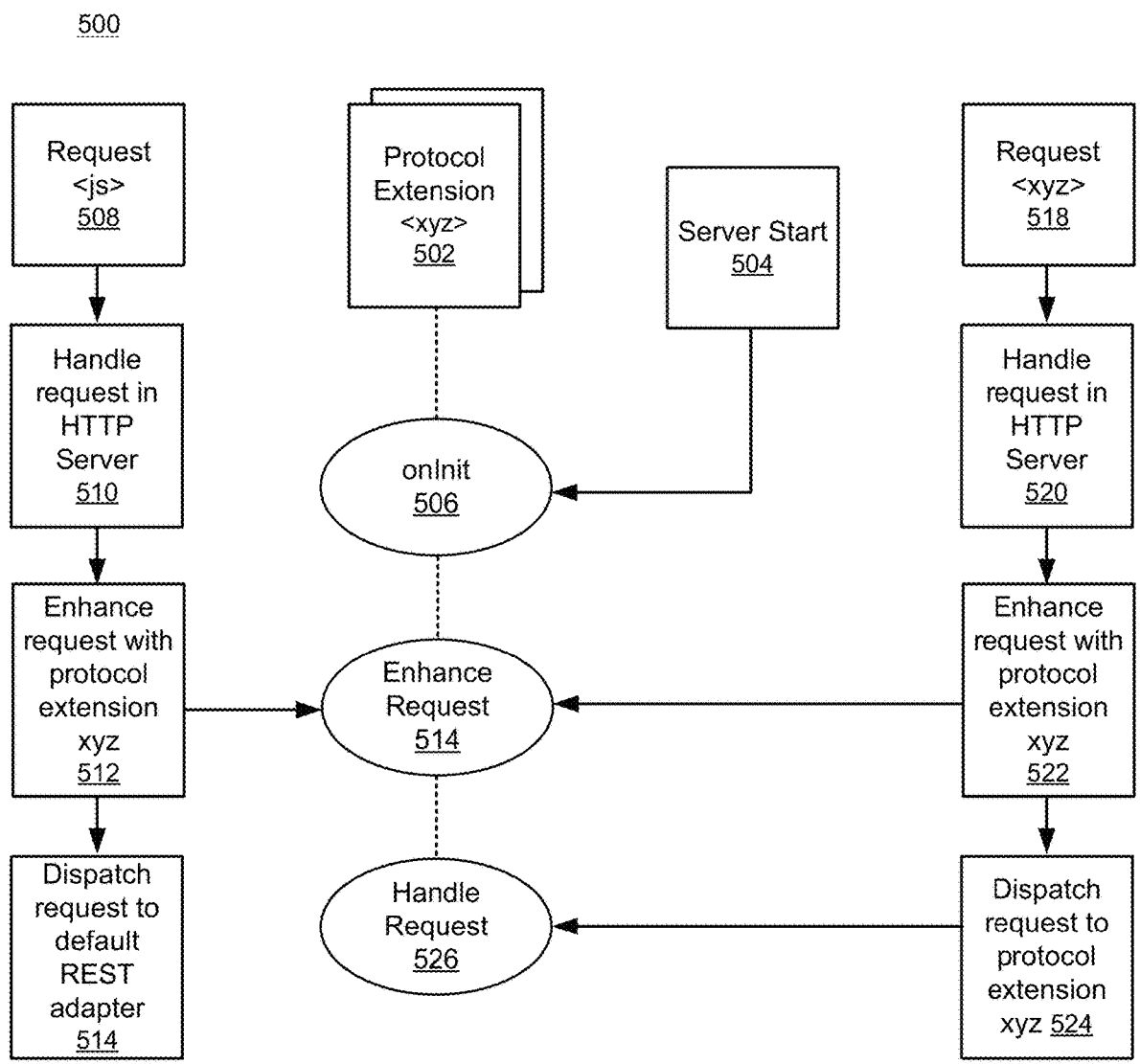
FIG. 5 is a flowchart illustrating example runtime operations of the system of FIG. 3.

FIG. 5 is a flowchart 500 illustrating example runtime operations of the system 300 of FIG. 3. In the example of FIG. 5, the protocol extension xyz is presumed to be available for runtime operations as a result of the operations of the flowchart 400 of FIG. 4 (502). During server start operations (504), the initialization operations described herein may be executed (506), to register the protocol extension xyz 320, and any other included protocol extensions.

Upon receipt of a request having a .js file extension (508), the request may initially be handled within the HTTP server 304 (510). In the example of FIG. 5, the request is enhanced for potential future operations in conjunction with the protocol extension xyz (512), as described above with respect to the "enhancerequest" function, resulting in the enhancement of the request (514) in the manner described above.

Subsequently, the request may be dispatched to the default rest adaptor 312 (516), based on detection of the .js file extension of the request. Although not specifically illustrated in the example of FIG. 5, it will be appreciated that the application object framework runtime 324 may thus proceed to execute any database action included within the request, and ultimately return a result of such database actions to the client 302.

When a second request is received that should be processed by the xyz protocol extension 320 (518), it will also initially be handled within the HTTP server 304 (520). Again, the request may be enhanced by the function "enhancerequest" in the manner described above (522, 514). Finally, the request may be dispatched to the protocol extension xyz 320 (524) for handling of any database action specified therein (526).

Figure 6:
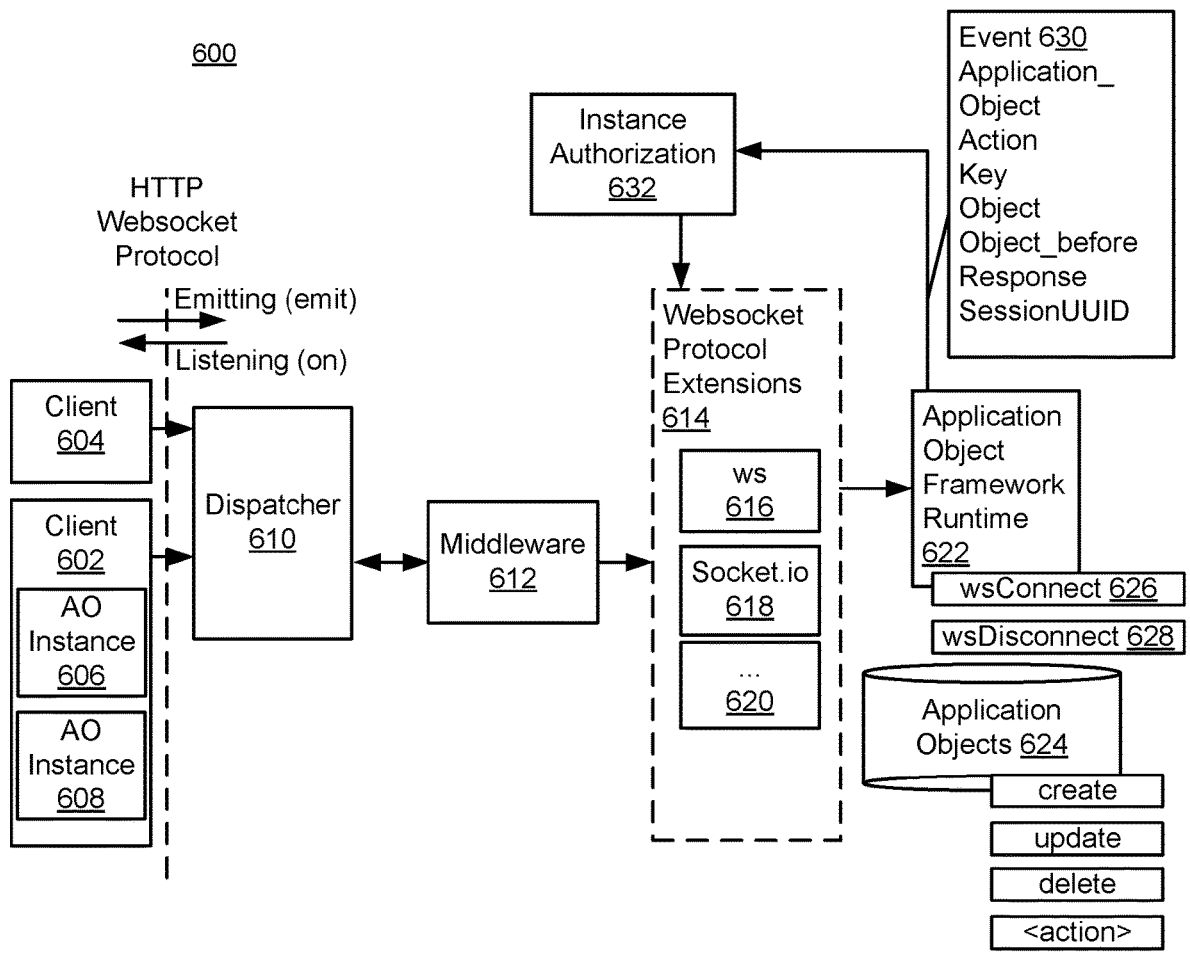
FIG. 6 is a block diagram of a system for implementing bidirectional communications using the application object framework of FIG. 1.

FIG. 6 is a block diagram of a system 600 for implementing bidirectional communications using the application object framework 101 of FIG. 1. In some implementations, such bidirectional communications protocols may be implemented as an example of the types of protocol extensions 110 described above with respect to FIG. 1. Additionally, or alternatively, such bidirectional communications protocols may be enabled natively within the application object framework. For example, such bidirectional communications protocols may be provided separately from a protocol extension framework, such as the protocol extension framework of FIG. 1.

In more detail, in many instances of client/server network communications, the client is responsible for triggering a loading of application data that may be available at a specified server, even for refresh operations. In other words, such communications protocols may be considered to be unidirectional in the sense that only the client is responsible for, or capable of, requesting newly-available data. In the system 500 of FIG. 5, however, bidirectional network communications are enabled in the sense that server side initiation of data transfer may be utilized to provide newly-available data from the server to all relevant clients, without requiring a request or other action on the part of each client for such newly-available data. Such bidirectional network communications may be referred to as simultaneous bidirectional communications. Accordingly, the system 500 is capable of providing data to clients in a timely fashion, and in a manner that conserves network bandwidth and generally minimizes use of network resources, relative to existing solutions.

More particularly, as described in detail below, the system 600 of FIG. 6 is configured to leverage the resources and structure of the application object framework 101 to provide bidirectional communication in a manner that utilizes available semantics, functionalities, and other application-specific aspects of the various application objects of the application object framework 101, e.g., through the use of application metadata already existing within the application object framework 101. In this way, application developers may be provided with an ability to develop applications that take advantage of the benefits of bidirectional communications, e.g., without being required to hardcode application-specific aspects of such bidirectional communications for each application being developed.

In other words, typical bidirectional communication protocols, including existing bidirectional communications protocols such as the web socket protocol referenced above and described in detail below, generally provide low level communications that may be agnostic to, or unaware of, implementation details of an application utilizing the bidirectional communications protocols. For example, continuing with the example of the web socket protocol, it is possible to use the standardized HTML 5 language to implement the web socket protocol for bidirectional communication. However, such bidirectional communications may pass data as, e.g., a simple string. Consequently, for example, a client application receiving such a string from a server must generally include some functionality for, e.g., interpreting, characterizing, or otherwise using the received string.

In the example of FIG. 6, a client application 602 and a client application 604 represent the potential plurality of client applications that may be used to benefit from the features and functions of the system 600 of FIG. 6, as described herein. In particular, as shown, the client 602, e.g., including a user interface thereof, may be rendered using an application object instance 606 and a separate application object instance 608. As may be appreciated from the above description of FIG. 1, each application object instance 606, 608 corresponds to its respective application object, and is built in a manner that leverages and otherwise utilizes related application object metadata.

Accordingly, as described in detail below, these and other structural aspects of the application object framework 101 may be utilized to provide bidirectional communications that are potentially specific to individual application objects and application object instances. Moreover, such an approach to enabling bidirectional communications enables application developers to develop new and multiple types of software applications having bidirectional communications capabilities, without having to code such bidirectional communications capabilities separately for the varying semantics, functionalities, and other aspects of the various software applications being coded.

Moreover, because rendering of the user interface that the client 602 occurs based on individual application object instances, it is possible to execute bidirectional communications with individual ones of the application object instances 606, 608. For example, if a server side change occurs that affects only application object instance 608, then only a portion of a user interface rendered at the client 602 associated with the application object instance 608 will be required to be re-rendered. In this way, for example, resources of an intervening network, and of the client 602, may be conserved, while minimizing a time necessary to, e.g., reload webpages or otherwise provide the newly-available information to a user of the client 602.

Further, the system 600 enables simultaneous use and benefit of the described bidirectional communications for both of the clients 602, 604. That is, for example, both the clients 602, 604 may engage in simultaneous (e.g., overlapping, or parallel) communications with a single server and associated application, application object, or application object instances. In such scenarios, of course, a change at the server may affect both the clients 602, 604. Moreover, a change at one of the clients 602, 604 may have an impact on server-side data, which may then, in turn, affect the other client of the clients 602, 604. In this regard, as described in detail below, each client 602, 604 may be provided with an ability to generate a universally unique identifier (UUID) for corresponding, individual sessions. As described herein, such identifiers may be specific to individual application objects, application object instances, or any identified client/server session. Also, as just referenced, such a session may be unique to the client 602, or may include a shared session in which both the clients 602, 604 participate.

Although it will be appreciated that the application object framework 101 may be used to construct a large number of different types of applications, for purposes of example, the following description will at times refer to a specific scenario in which an application provides innovation management and associated collaboration tools for users. For example, such an application might be implemented that enables a number of users at remote locations from one another to, e.g., submit ideas for successfully completing a project, comment on ideas submitted by others, and generally interact and collaborate with one another in a manner designed to facilitate completion of a team or group goal. Although similar applications might be implemented using other techniques, the example is provided and described herein for the purpose of, e.g., illustrating a manner in which such an application may be advantageously designed, developed, implemented, maintained, and extended, using the application object framework 101.

In some examples described herein, the innovation management and associated collaboration tools described above may be implemented using, and may benefit from, the bidirectional communication capabilities of the system 600 of FIG. 6. For example, the client 602 and the client 604 may represent two remote users who are collaborating together in the context of a shared goal. Accordingly, the two users may, for example, collaboratively and interactively edit or create a document, engage in one or more chat sessions, or otherwise interact with one another in real time or near real time. Thus, for example, the application object instance 606 may represent, or correspond to, a chat session, while the application object instance 608 may represent a second chat session, or a shared document (or portion(s) thereof).

In the example of FIG. 6, messages or other data received from one or both of the clients 602, 604 may be received at a dispatcher 610, in a manner similar to that described above with respect to the dispatcher 306. As also referenced above, a middleware 612 may be configured to route messages from each of the clients 602, 604, or other clients (not illustrated) to one of the plurality of web socket protocol extensions 614. As referenced above, and described in more detail below, the example of FIG. 6 illustrates an example web socket protocol extension "ws" 616, as well as a second web socket protocol extension using "socket.io" 618. As also illustrated, the extensions 616, 618 are included as merely non-limiting examples, and additional web socket protocol extensions, or other types of bidirectional communications protocols, may be extended and/or implemented, as referenced by a third protocol extension 620 in the example of FIG. 6.

Further, as already generally described above, it would be appreciated that, in various examples, messages received from the clients 602, 604 will generally identify, in some manner, one or more relevant application objects or application object instances, along with any database action to be initiated or executed in response to the received request. That is, as already described, such database actions may be executed in the context of an application object framework runtime 622, to thereby execute, for example, crud operations, or other customized operations, on corresponding application objects 624.

In the following description, examples are primarily provided with respect to the illustrated implementations including the web socket implementation "ws" 616, as well as the web socket implementation "socket.io," which, as described in detail below, generally provides additional interfaces as compared to the ws implementation, as well as a name space concept.

Accordingly, in the example of the system 600 of FIG. 6, it will be appreciated from the above description of FIG. 3 that the web socket protocols extensions 614 may be utilized to support any implementation supported by the underlying application object framework, and may be configured together with the overall server configuration. In particular, the server middleware 612 may be configured to handle routing of web socket requests to a correct web socket protocol extension, whereupon the receiving web socket protocol extension may proceed to handle any included request event information. That is, as described above, such handling may include mapping of the request event information to the core interface of the application object framework runtime 622, including executing crud actions and any associated customized database actions of the underlying application object identified in the received request.

Thus, requests admitted from the client side and received at the server side will be handled in the manner just described. In addition, in the particular context of bidirectional communications protocol, it will occur that information originating or otherwise occurring on the server side will be provided from the server side in the direction of the client applications. For example, as shown in FIG. 6, the client application 602 is illustrated as both admitting messages and listening for messages, and this active admitting/listening may occur reciprocally at both the client and server sides, as long as a web socket connection is maintained between a specific client and a corresponding application object of the application object framework.

With respect to the ws extension implementation 616, at connection of a web socket client on the server side, a registration to a "message" event may be established to receive all relevant events in this context. In addition, "close" and "error" events may be registered to perform cleanup operations with respect to data relevant to the application object in question, to be used, e.g., when the connection is closed or encounters an error.

In more detail, to establish a web socket client connection, an upgrade request URL of a received web socket message may be transformed into a specific application object name, using a previous configuration of the application object framework server. In particular, at a time of client connection to an application object instances, if the identified application object has a static action called "wsconnect" 626, the static action is called for the application object. The static action allows the application logic to be notified about a new client connection. As a result, the wsConnect 626 provides a directory of associated instances and clients for a given application objects (e.g., that a particular application object has the AO instance 606 with the client 602, and a second AO instance (not shown) with the client 604).

Meanwhile, at a time of client disconnection, if the identified application object has a static action called "wsdisconnect" 628, then the static action is called for the application object. The static action allows the application logic to get notified about a client disconnection, and execute any necessary cleanup procedures, thus effectively removing that client/instance from the directory.

During communication received from, i.e., admitted by, the client 602, a message may be constructed as a JavaScript object notation (JSON) object. As described and referenced in more detail below, such a JSON object generally refers to a message in which data is constructed and identified in a manner that is consistent with (e.g., is a subset of) the JavaScript language. As a result, both the message and the meaning of terms and other aspects of the message may be identifiable by a human reader, as well as by a JavaScript implementation on the server side at the application object framework.

Accordingly, the received JSON object may be parsed and checked to contain, e.g., an identified action, such as a name of the application object action that is desired, as well as parameters for each identified action call. Accordingly, the application object action, if included, may be executed using the provided action parameters. Accordingly, for example, a resulting transaction may be committed within the backend database of the application object framework. It will be appreciated that the resulting database action, upon completion, may necessitate a notification to one or more of the client applications 602, 604. For example, an update admitted by the client application 602 may be executed at the database, whereupon the relevant web socket protocol extension will be configured to notify, e.g., the client 604 of the result, even when the client 604 has not explicitly requested this specific result to be sent. Techniques for these types of server-side notifications or events are provided below, e.g., in the context of the illustrated event 630.

With respect to the socket.io protocol extension 618, at initialization of the web socket protocol extension 618, the name space concept of socket.io may be leveraged to establish, for each application object URL path, a name space object. For each name space object, a "connection" event may be registered. In addition, for each application object action, a respective named event may be registered as well, to thereby enable the receiving of all relevant events and the relevant context. As referenced above, a "disconnect" event may also be registered, e.g., to clean up application object of the data, such as when the connection is closed or an error occurs.

As described above, the ws connect action 626 may be identified as being associated with a relevant application object at a time of client connection. As also referenced, the ws connect action 626 may be a static action, e.g., may be associated for an application object, as opposed to a specific application object instance. As also referenced, the ws connect action 626 will allow a relevant application logic to be notified regarding any new client connection. Further, as also referenced above, at a time of client disconnection, if the identified application object has a static action called wsdisconnect 628, the static action 628 will be called for the application object, to allow the application logic to be notified regarding a client disconnection, and, e.g., execute relevant cleanup procedures.

In these scenarios, when an application object action message is received, the message payload itself is expected to contain the arguments needed for the application object action call. As referenced, the application object action may thus be executed with included parameters, and the resulting transaction may be committed to the relevant database.

As referenced above, in the context of bidirectional communications, application events, such as the application event 630, may be utilized to actively notify web socket clients with respect to data changes within the application object framework. For example, the application object framework may, by default, offer a built-in application event, used to notify any relevant listener using an event mechanism. Changes may be of a static nature (such as e.g., calling a static action), or of an instance nature (e.g., such as calling an action to an application object instance).

In operation, each web socket protocol extensions implementation 616, 618, 620 may be configured to register to application events of the application object framework, such as the event 630. Accordingly, each web socket protocol extensions implementation 616, 618, 620 may be notified about any application object change, regardless of how the change was triggered. Then, the application object framework runtime 622 may be configured to handle all notifications occurring during a database transaction commit to all registered listeners of the web socket protocol extensions 616, 618, 620.

Specifically, as shown, the event 630 may be generated as a JSON object. As shown, the event 630 may include a name of the affected application object, as well as an action name of the application object action executed (e.g., static or instance-based).

For instance-based actions, a key of the application object instance may be included, as well as a JSON representation of the application object instance after the action call, as well as a JSON representation of the application object instance before the action call. Further, the response data of the action call may be included, e.g., may contain messages or action result datasets. Finally with respect to the event 630, a globally unique session uuid may be included, as referenced above with respect to FIG. 1, in order to identify the relevant client who called for the relevant application object action to be executed. Further example aspects of the event 630 are provided in the context of the usage example, below, following the description of FIG. 9.

An instance authorization 632 may then be performed. For example, some instances may be prohibited from receiving updates performed at another instance. In other examples, some instances may be prohibited from initiating updates or making specified types of changes.

Thus, a particular web socket protocol extension implementation 616, 618, or 620 may receive the event 630, as a registered event listener, and thereafter admit a corresponding message on its open web socket connection and thereby notify one or more registered clients. For example, in the ws implementation 616, the message may be admitted as a serialized JSON object. For the socke.io implementation 618, the message may contain the information of the event 630, included as function arguments of the receiving client message function. Moreover, as the socket.io implementation 618 provides a higher level API leveraging the name space concept, and provides multiple event parameters (including, potentially, parameter types other than merely string parameters, and may therefore, in some scenarios, provide advantages over the ws implementation 616). Of course, as described, various other implementations of the web socket protocol, or other bidirectional communication protocols, also may be utilized.

As referenced above with respect to FIG. 1, the session uuid of the event 630 may originally be created on the client side, e.g., at the client application 602. For example, each application object on the client side may create a globally unique session uuid, e.g., during an object instantiation, or when triggering a backend request (database action). For example, the session uuid may be provided to the server as a request header. Each request may thus be identified by this session uuid, and business events (e.g., the event 630) triggered by a different client (e.g., a user, or a browser tab that requires synchronization). Consequently, the client application can check for the session uuid included within a web socket request.

The session UUID enables a particular client to identify itself as a source of a web socket request, e.g., to avoid unnecessary or redundant actions. For example, if a client triggers a change to a UI (e.g., updates a field), then the change will be propagated to other registered client(s). However, it would be redundant and inefficient for the change to be propagated back to the client itself, since by definition the client's field was already updated and does not need to be updated again. By checking the session UUID, such unnecessary updates may be avoided.

Figure 7:
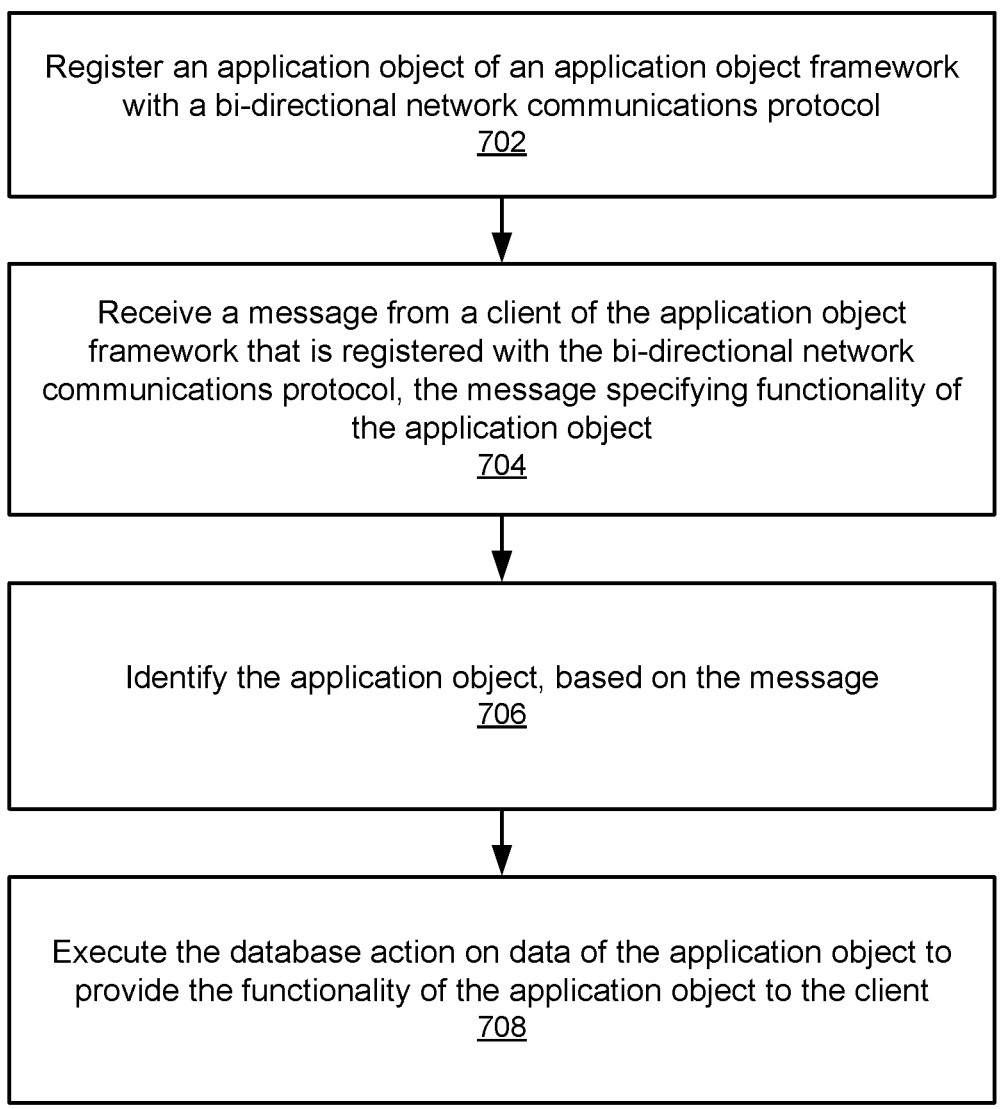
FIG. 7 is a flowchart illustrating example operations of the system of FIG. 6.

FIG. 7 is a flowchart 700 illustrating example operations of the system of FIG. 6. In the example of FIG. 7, an application object of an application object framework is registered with a bi-directional network communications protocol (702). For example, an application object of the application objects 624 may be registered with one or more of the extensions 614, e.g., the we extension 616, or the socket.io extension 618.

A message may be received from a client of the application object framework that is registered with the bi-directional network communications protocol, the message specifying functionality of the application object (704). For example, the client 602 may have an application object instance of the application object that is registered with the same protocol extension (e.g., 616, or 618), and may emit a message received at the dispatcher 610, as described above with respect to FIG. 6.

The application object may be identified, based on the message (706). For example, the relevant extension (616, or 618) may parse or unmarshall the message and map aspects of the message to the functionality of the associated application object.

Accordingly, database action may be executed on data of the application object to provide the functionality of the application object to the client (708). For example, the application object framework runtime 622 may be utilized to create, read, update, or delete data of the application object, or to execute customized database actions.

Figure 8:
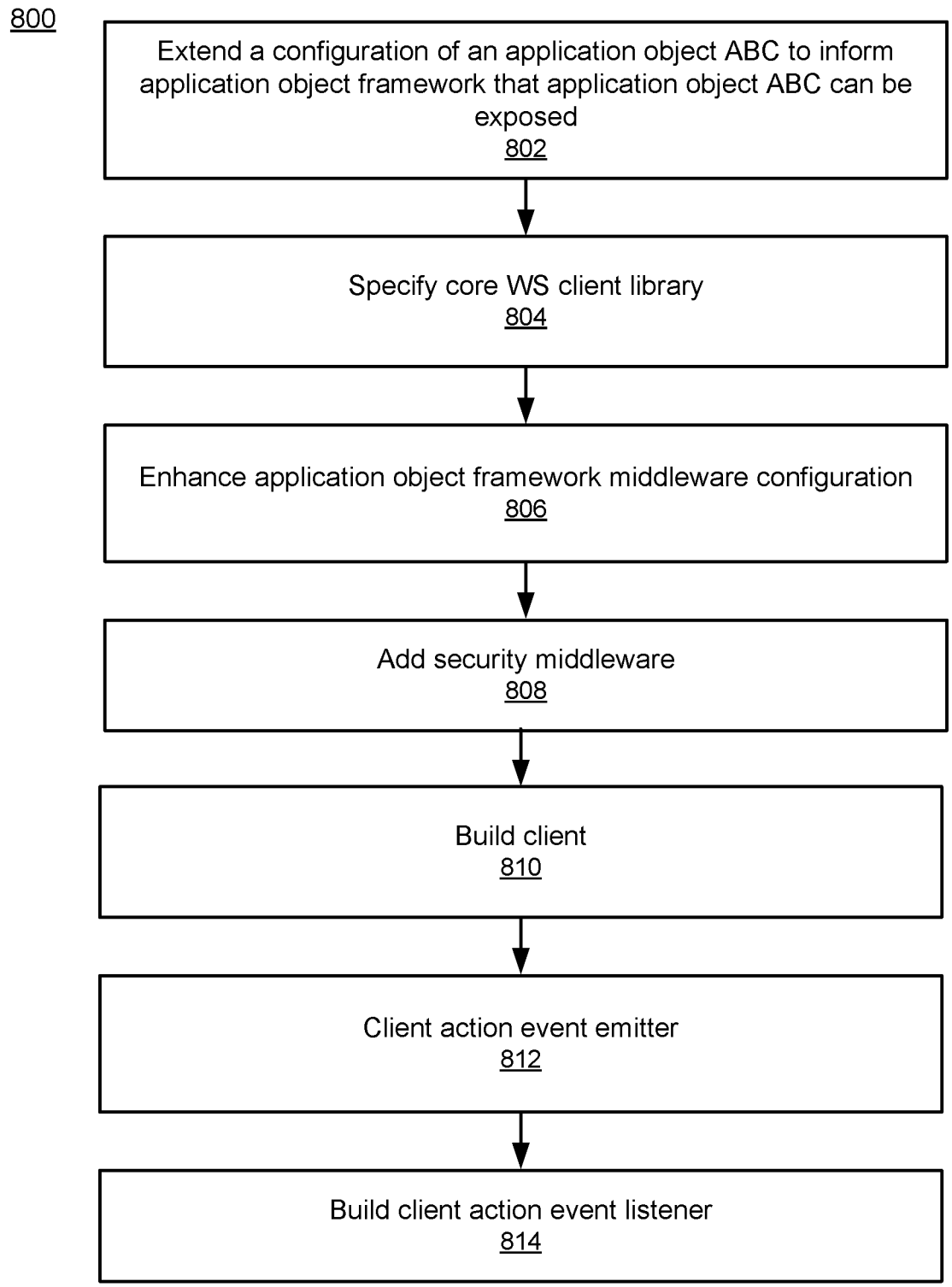
FIG. 8 is a flowchart illustrating example design-related operations of the system of FIG. 6.

FIG. 8 is a flowchart 800 illustrating example design-related operations of the system of FIG. 6. In the example of FIG. 8, an application object "ABC" has its configuration extended to inform the application object framework that the application object ABC (and, e.g., the URL thereof) is capable of being exposed through websockets or other defined protocol extension (802).

Then, a core websockets (WS) client library may be specified (804). As described herein, this core WS library provides a basis on which the described protocol extensions are built and mapped to the application object framework.

The application object framework middleware may be enhanced (806). For example, the middleware may be enhanced for routing of relevant URLs.

Security middleware may be added (808). As described, such additional security may be necessary or desired to ensure that appropriate restrictions are placed on the abilities of individual clients/users to make or see changes with respect to individual instances of the relevant application object(s).

An appropriate client may then be built, if necessary (810), such as the construction of an appropriate user interface to render the relevant application object instances, and any associated client library. A client AOF action event emitter may be provided (812) that enables emitting of a change or request, such as a crud event. Similarly, a client AOF action event listener may be built (814) to enable notification of such emitted events from other clients.

Figure 9:
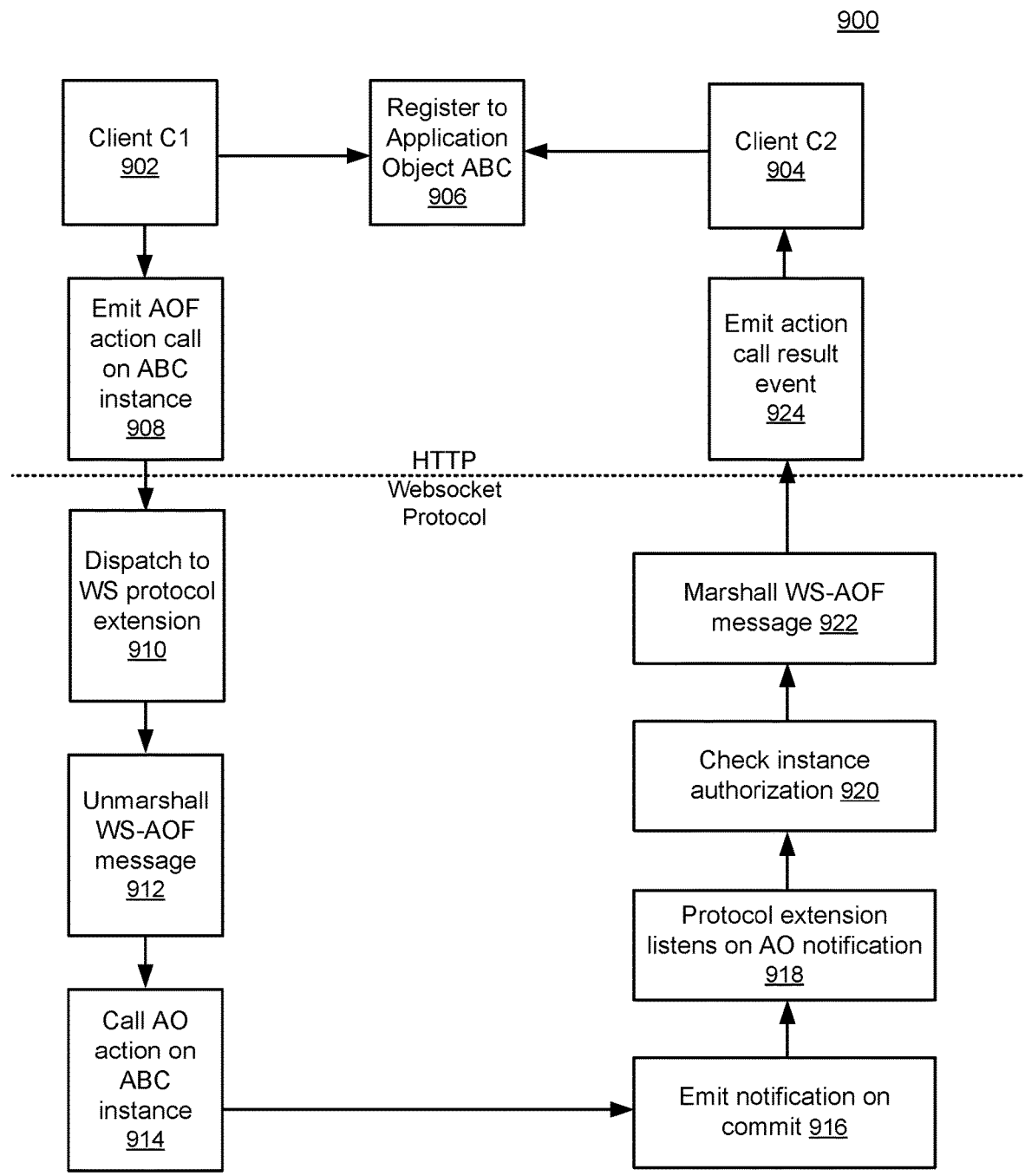
FIG. 9 is a flowchart illustrating example runtime operations of the system of FIG. 6.

FIG. 9 is a flowchart 900 illustrating example runtime operations of the system of FIG. 6. In the example of FIG. 9, a first client C1 (e.g., the client 602 of FIG. 6) (902) and a second client C2 (e.g., the client 604 of FIG. 6) (904) register to the application object ABC of FIG. 8 (906). For example, as may be generally appreciated from the above description, each client's user interface may connect to an application object by setting up a web-socket connection either on a namespace, i.e. the application object URL path for the socket.io implementation, or to the normal server endpoint, e.g. for the WS implementation. Each web-socket change can be received by handling the respective application object action using the "on"-function (i.e., the listening function of the websockets protocol). The function arguments correspond to the notification data parts in the same order as listed above in case of the socket.io implementation. For the WS implementation, all messages can be received by registering a function to the "on message"-function. In such cases, the notification data may be parsed as JSON object(s) from the relevant message string(s).

Once registered, it may occur that an AOF action call is emitted on an instance of the application object ABC (908). For example, continuing the examples from above, the application object might be related to an application for innovation management, including posting ideas for a project to a shared whiteboard. In such examples, the action call might be to update the underlying database with a newly-posted idea. Consequently, a message may be sent according from the client C1, in which, as described herein, the semantics of the particular application are expressed by leveraging the existing emit function of websockets.

The received message may then be dispatched to the appropriate WS protocol extension 616 (910), where the message may then be unmarshalled (912). That is, as just referenced, the message may be parsed to map the included content to the semantics of the relevant application object ABC.

Accordingly, the corresponding action (e.g., write to database) may be called on the relevant instance of the application object ABC (914). Once completed, e.g., once the write action is committed (and assuming no error or associated rollback is experienced), a corresponding notification may be emitted (916).

As the corresponding WS protocol extension 616 listens on application object notifications (918), the emit event will be received, and processing of the event may begin. Instance authorization may be checked (920), e.g., to ensure that only those clients (e.g., the client C2) executing corresponding instances are authorized to receive the corresponding message.

Then, the message to be sent may be marshalled (922), including the leveraging of the appropriate WS client library, and the application object framework including relevant metadata. In this way, an appropriate action call result event may be emitted to the client C2 (924), such as the notification of the posting of the idea in the shared workspace by the client C1.

The following usage example(s) provides specific techniques for implementing some of the various embodiments provided above, but should not be considered to be limiting or exhaustive.

For example, an implementation of the Socket.io extension 618 can be activated in the context of a Node.js implementation as shown in pseudocode 3:

PSEUDOCODE 3

```
var express = require("express");
var http = require("http");
var socketio = require("socket.io");
var aof = require("sap-aof");
var app = express( );
var server = http.Server(app);
var io = socketio(server);
aof.middleware(app, {
  applicationObjects: {
    "<application_object_name>": "url_to_application_object",
    ...
  },
  extensions: {
    websocket: {
      name: "socket.io",
```

-continued

PSEUDOCODE 3

```
      lib: io
    }
  }
});
```

An example implementation of a web socket connection request enhanced using express middleware calls as described above is demonstrated in pseudocode 4, in which, as also referenced above, a web socket request can be authenticated using the passport module:

PSEUDOCODE 4

```
var passport = require("passport");
aof.middleware(app, {
  extensions: {
    websocket: {
      name: "socket.io",
      lib: io,
      middleware: [
        passport.authenticate("JWT", {session: false})
      ]
    }
  }
}
```

Each published application object configured in the AOF middleware may be accessible via a web socket channel, based on the object's URL as namespace. The application objects core actions (CRUD) and the custom actions are mapped to the socket.io emit and on functions. For example, the action name may correspond to the emit event name, and the request data may be mapped to the emit parameters.

The corresponding namespace specific Socket.io object may be accessed within an application object implementation from the caller context as shown in pseudocode 5:

PSEUDOCODE 5

```
var io = oContext.getCallerContext( ).getSocketIO( );
io.emit("create", { "ID": -1, ... })
```

A global Socket.io library can be accessed using pseudocode 6:

PSEUDOCODE 6

```
var io = oContext.getCallerContext( ).socketio
```

A namespace specific socket for another application object can be retrieved using pseudocode 7:

PSEUDOCODE 7

```
var io =
oContext.getCallerContext( ).getSocketIO(<ApplicationObjectName>)
```

Application objects exposing the above-described static actions called wsConnect 626 and wsDisconnect 628 may be automatically called with the respective action upon Socket.io connection or disconnection of a client web socket.

An application object's core actions (CRUD) and instance custom actions may be automatically published to all connected socket listeners, e.g., including publishing the action name as a Socket.io event and the object instance data as event parameters. Socket listeners may register to action executions via the Socket.io on function, specifying the action name as socket event. Each socket listener is called with the object data and additional parameters, as shown in the example of pseudocode 8:

---
PSEUDOCODE 8
---
io.on("create", function (vKey, oObject, oObjectBefore, oResponse, sSessionUUID) {
   var iId = oResponse.generatedKeys[−1];
   // ...
});
---

Such parameters may include, e.g., information about key, object, objectBefore, response and sessionUUID.

A browser client can connect to the Socket.io library using pseudocode 9:

---
PSEUDOCODE 9
---
<script src="/socket.io/socket.io.js"></script>
---

A connection to an application object may be established by passing the application object URL path as Socket.io namespace, e.g., as shown in pseudocode 10:

---
PSEUDOCODE 10
---
var io = io("<url_to_application_object>");
---

Application Object actions (including CUD actions) can thus be called using emit, e.g. for action "create", as shown in pseudocode 11:

---
PSEUDOCODE 11
---
io.emit("create", { "ID": −1, ... });
---

Listener registration to an application object action execution may be performed using the on command as follows, e.g. for action "create", as shown in pseudocode 12:

---
PSEUDOCODE 12
---
io.on("create", function (vKey, oObject, oObjectBefore, oResponse, sSessionUUID) {
   var iId = oResponse.generatedKeys[−1];
   // ...
});
---

As also described above, a session UUID identifies globally (across all browser sessions) an application object instance, and helps to identify whether changes performed were not initiated by the user receiving an update. The session UUID of an application object instance to be compared can be fetched using a getSessionUUID function.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed, are configured to cause at least one computing device to at least:
   receive, at a protocol extension framework of an application object framework, a first request constructed using a hyper text transfer protocol of a client application, the request registering a protocol extension and associated protocol extension configuration file;
   receive, from the client application, a second request constructed using the hyper text transfer protocol of the client application, the second request identifying an application object and specifying a database action for accessing application object data of the application object from within an in-memory database system coupled to the application object framework;
   select, based on the second request, the protocol extension from among at least two registered protocol extensions, the selected protocol extension configured to route the second request to the application object identified by the second request, the selected protocol extension being a web socket based protocol configured to the in-memory database system and configured to provide a corresponding database action at the in-memory database system;
   translate the database action specified using the hyper text transfer protocol of the client application to the corresponding database action specified using the selected protocol extension;
   execute the corresponding database action with respect to the application object data;
   translate the result of the execute from the selected protocol extension of the in-memory database to the hyper text transfer protocol of the client application; and
   provide, based on the hyper text transfer protocol of the client application, the translated result to the client application.

2. The computer program product of claim 1, wherein the second request received from the client application includes a uniform resource locator of the application object.

3. The computer program product of claim 2, wherein the uniform resource locator includes a file extension, and wherein to select the protocol extension, the instructions, when executed, are further configured cause the at least one computing device to at least select the protocol extension based on the file extension and/or based on the protocol extension configuration file.

4. The computer program product of claim 1, wherein the protocol extension includes an initialization function called during a start-up process of at least one server executing the application object framework, based on a server configuration for the server indicating a match between the protocol extension and the application object.

5. The computer program product of claim 1, wherein the selected protocol extension includes an enhance request function configured to enhance the second request in a manner pre-configured for the selected protocol extension and that adds at least one property for processing the second request that is not specified in the second request by the protocol of the client application.

6. The computer program product of claim 1, wherein a server configuration for at least one server executing the application object framework includes a name for each of the at least two registered protocol extensions.

7. The computer program product of claim 6, wherein the server configuration includes, for the protocol extension, at least one protocol extension option used in executing the corresponding database action.

8. The computer program product of claim 1, wherein the instructions, when executed, are further configured to cause the at least one computing device to at least:
   obtain a result of the executing of the database action.

9. The computer program product of claim 1, wherein the protocol extension includes a bi-directional protocol based on the websockets protocol.

10. A method comprising:
   receiving, at a protocol extension framework of an application object framework, a first request constructed using a hyper text transfer protocol of a client application, the request registering a protocol extension and associated protocol extension configuration file;
   receiving, from the client application, a second request constructed using the hyper text transfer protocol of the client application, the second request identifying an application object and specifying a database action for accessing application object data of the application object from within an in-memory database system coupled to the application object framework;
   selecting, based on the second request, the protocol extension from among at least two registered protocol extensions, the selected protocol extension configured to route the second request to the application object identified by the second request, the selected protocol extension being a web socket based protocol configured to the in-memory database system and configured to provide a corresponding database action at the in-memory database system;
   translating the database action specified using the hyper text transfer protocol of the client application protocol to the corresponding database action specified using the selected protocol extension;
   executing the corresponding database action with respect to the application object data.

11. The method of claim 10, wherein the second request received from the client application includes a uniform resource locator of the application object.

12. The method of claim 11, wherein the uniform resource locator includes a file extension, and wherein selecting the protocol extension further comprises selecting the protocol extension based on the file extension and/or based on the protocol extension configuration file.

13. The method of claim 10, wherein the protocol extension includes an initialization function called during a start-up process of at least one server executing the application object framework, based on a server configuration for the server indicating a match between the protocol extension and the application object.

14. The method of claim 10, wherein the selected protocol extension includes an enhance request function configured to enhance the second request in a manner pre-configured for the selected protocol extension and that adds at least one property for processing the second request that is not specified in the second request by the protocol of the client application.

15. The method of claim 10, wherein a server configuration for at least one server executing the application object framework includes a name for each of the at least two registered protocol extensions.

16. The method of claim 15, wherein the server configuration includes, for the protocol extension, at least one protocol extension option used in executing the corresponding database action.

17. The method of claim 10, further comprising:
obtaining a result of the executing of the database action.

18. A system comprising:
at least one processor; and
at least one memory including computer program code, the at least one memory and computer program code configured to, with the at least one processor, cause the system to at least:
receive, at a protocol extension framework of an application object framework, a first request constructed using a hyper text transfer protocol of a client application, the request registering a protocol extension and associated protocol extension configuration file;
receive, from the client application, a second request constructed using the hyper text transfer protocol of the client application, the second request identifying an application object and specifying a database action for accessing application object data of the application object from within an in-memory database system coupled to the application object framework;
select, based on the second request, the protocol extension from among at least two registered protocol extensions, the selected protocol extension configured to route the second request to the application object identified by the second request, the selected protocol extension being a web socket based protocol configured to the in-memory database system and configured to provide a corresponding database action at the in-memory database system;
translate the database action specified using the hyper text transfer protocol of the client application to the corresponding database action specified using the selected protocol extension;
execute the corresponding database action with respect to the application object data;
translate the result of the execute from the selected protocol extension of the in-memory database to the hyper text transfer protocol of the client application; and
provide, based on the hyper text transfer protocol of the client application, the translated result to the client application.

19. The system of claim 18, wherein the client request includes a uniform resource locator (URL) of the identified application object, and wherein the uniform resource locator includes a file extension, and wherein to select the protocol extension, the at least one memory and computer program code are further configured to, with the at least one processor, cause the system to at least select the protocol extension based on the file extension and/or based on the protocol extension configuration file.

20. The system of claim 18, wherein the at least one memory and computer program code are further configured to, with the at least one processor, cause the system to at least:
obtain a result of the executing of the database action.

* * * * *